United States Patent [19]

Fujimoto

[11] 4,441,478

[45] Apr. 10, 1984

[54] CONTACTLESS MAGNETO IGNITION SYSTEM

[75] Inventor: Takanori Fujimoto, Himeji, Japan

[73] Assignee: Mitsubishi Denki Kabushiki Kaisha, Tokyo, Japan

[21] Appl. No.: 460,875

[22] Filed: Jan. 25, 1983

Related U.S. Application Data

[63] Continuation of Ser. No. 227,977, Jan. 23, 1981, abandoned.

[30] Foreign Application Priority Data

Feb. 8, 1980 [JP] Japan .................................. 55-15202

[51] Int. Cl.³ ............................................. F02P 1/00
[52] U.S. Cl. ................................... 123/602; 123/603; 123/149 C
[58] Field of Search ........... 123/602, 603, 418, 149 C, 123/410, 415, 599

[56] References Cited

U.S. PATENT DOCUMENTS

| | | | |
|---|---|---|---|
| 3,447,521 | 6/1969 | Pileo | 123/602 |
| 3,630,185 | 12/1971 | Struber et al. | 123/602 |
| 3,861,372 | 1/1975 | Shikukawa et al. | 123/602 |
| 3,903,862 | 9/1975 | Nagasawa | 123/602 |
| 4,014,309 | 3/1977 | Nagasawa | 123/603 |
| 4,079,712 | 3/1978 | Nagasawa | 123/602 |
| 4,150,652 | 4/1979 | Nagasawa | 123/602 |
| 4,170,207 | 10/1979 | Boyama | 123/602 |
| 4,184,467 | 1/1980 | Kato et al. | 123/602 |
| 4,244,336 | 1/1981 | Rilzner | 123/602 |
| 4,306,535 | 12/1981 | Rilzner | 123/602 |
| 4,306,536 | 12/1981 | Rilzner | 123/602 |
| 4,318,387 | 3/1982 | Rilzner | 123/602 |

*Primary Examiner*—Raymond A. Nelli
*Attorney, Agent, or Firm*—Wenderoth, Lind & Ponack

[57] ABSTRACT

A flywheel magneto generates a first and a second angular signal in synchronism with the rotation of an internal combustion engine so that the second signal is broader in pulse width than and delayed by a predetermined time interval relative to the first signal. An ignition time calculation circuit converts the first signal to a rectangular pulse. The second signal is partly bypassed to ground until the pulse is ended in the high and moderate speed ranges of the engine. At the end of the pulse, the second signal cause a thyristor to conduct so as to determine an ignition time. In the low speed range, the pulse is disabled and the second signal cause the thyristor to conduct upon its reaching the threshold voltage of the thyristor.

4 Claims, 9 Drawing Figures

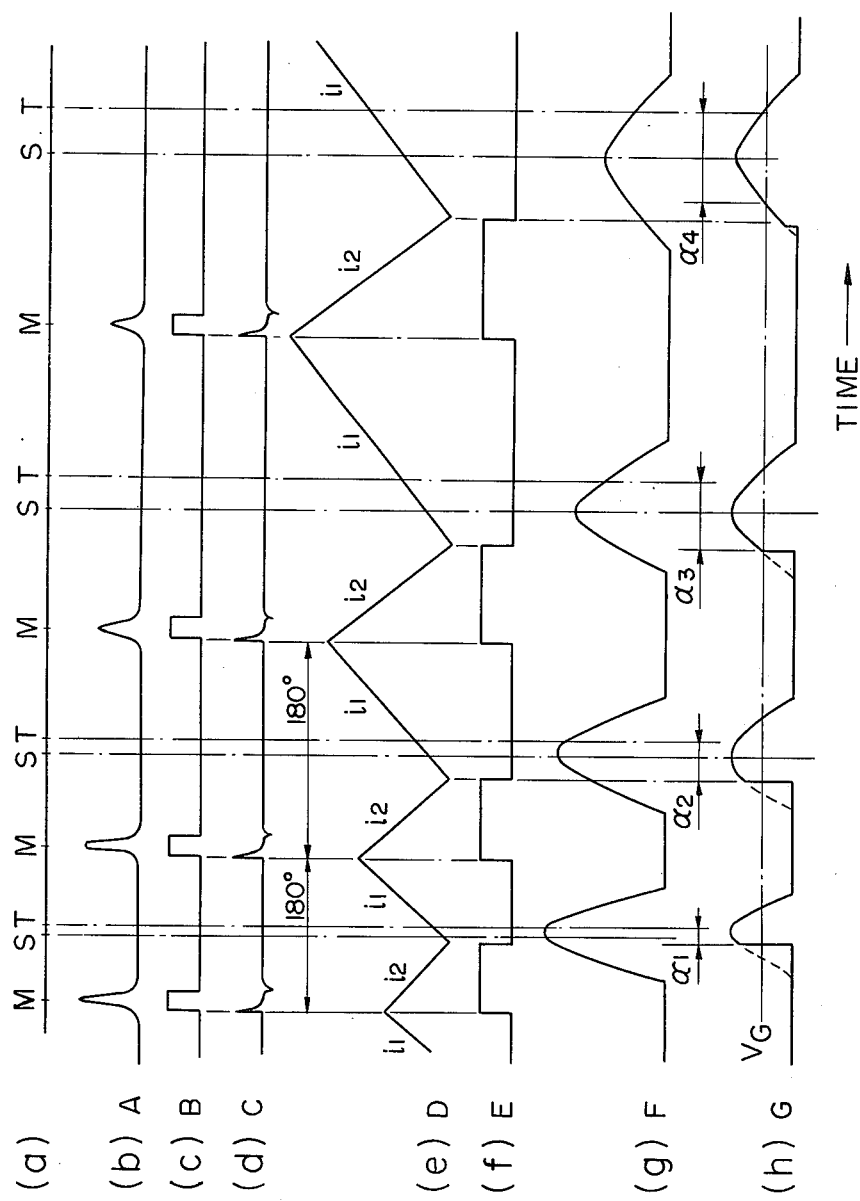

CONTACTLESS MAGNETO IGNITION SYSTEM

This is a continuation of now abandoned application Ser. No. 227,977 filed Jan. 23, 1981, now abandoned.

BACKGROUND OF THE INVENTION

This invention relates to a contactless, electronic magneto ignition system, and more particularly to a control system for controlling the ignition timing in accordance with the rotational speed of an internal combustion engine ignited by switching an ignition system.

Conventional engine ignition systems of the type referred to have been previously arranged to generate an ignition signal at each of the ignition times of the internal combusion engine, and switching a semiconductor switching element such as a thyristor or a transistor with the ignition signal to induce an ignition voltage across the secondary side of an ignition coil. Therefore, the ignition time has been naturally determined by a waveform for the ignition signal generated in synchronism with the rotation of the engine. In other words, these conventional ignition systems have been able to respond to spark advances required for preventing the occurrence of the reverse rotation of the engine in the low speed range but they have been unable to fulfill the requirements for the spark receding characteristics and the other characteristics necessary to maintain the horsepower output of the engine in the moderate to high speed range.

Also, conventional electronic ignition time control systems of the type referred to have been arranged to control the determination of a time at which the particular engine is to be ignited, by sensing the rotational speed of the engine before the necessary ignition time thereof. However the rotational speed of engines vary greatly in a low speed range and particularly during the start of engines. Under these circumstances, if the ignition time would be controlled by sensing the rotational speed of an engine before the necessary ignition time thereof, then the ignition time determined at that time is not the proper ignition position required for the engine. That is, an ignition position thus determined is extremely delayed with respect to the required ignition position. In addition, an amount of that delay has been sharply changed with the result that a stable ignition time is not provided.

Accordingly, it is an object of the present invention to eliminate the disadvantages of the prior art practice as described above by the provision of a new and improved magneto ignition system capable of providing the ignition timing characteristics at a moderate and a high speed range of an internal combustion engine.

SUMMARY OF THE INVENTION

The present invention provides a magneto ignition system for an internal combustion engine and comprising:

an electric source means for generating a positive and a negative output in synchronism with the rotation of the engine, an ignition coil, the electric source means being able to conduct the outputs to the ignition coil after their rectification, a switching element for controlling the conduction of the rectified outputs to the ignition coil, a first angular position sensor means for generating a first angular signal in synchronism with the rotation of the engine and corresponding to a predetermined crank position of the engine, a second angular position sensor means for generating a second angular position in synchronism with the rotation of the engine and corresponding to a crank position thereof which is delayed by a predetermined angle with respect to the predetermined crank position of the engine, and for directly supplying the second angular signal to the switching element, the second angular signal being broader in pulse width than the first angular signal, an ignition time calculating circuit for calculating an ignition time in accordance with the conditions for operating the engine with the first angular signal, and a control circuit responsive to a signal provided as a result of the calculation effected by the ignition time calculation circuit to bypass the second angular signal therethrough.

In order to ensure stable and accurate ignition times with the rotational speed of the internal combustion engine varying greatly in a low speed range, the magneto ignition system may comprise first means for forming a composite spark advance characteristic of a first spark advance characteristic resulting from the first angular signal and a second spark advance characteristic resulting from the second angular signal to cause only a portion on the receding side of the composite spark advance characteristic to contribute to the ignition, second means for forming the advancing and receding sides of the first and second spark advance characteristics respectively at and below a predetermined rotational speed of the engine, and third means for forming the receding and advancing sides of the first and second spark advance characteristics respectively above the predetermined rotational speed of the engine.

BRIEF DESCRIPTION OF THE DRAWINGS

The present invention will become more readily apparent from the following detailed description taken in conjunction with the accompanying drawings in which:

FIG. 5 is a graph illustrating waveforms developed at various points in the arrangement shown in FIG. 1 or 3;

DESCRIPTION OF THE PREFERRED EMBODIMENTS

Figure 1:
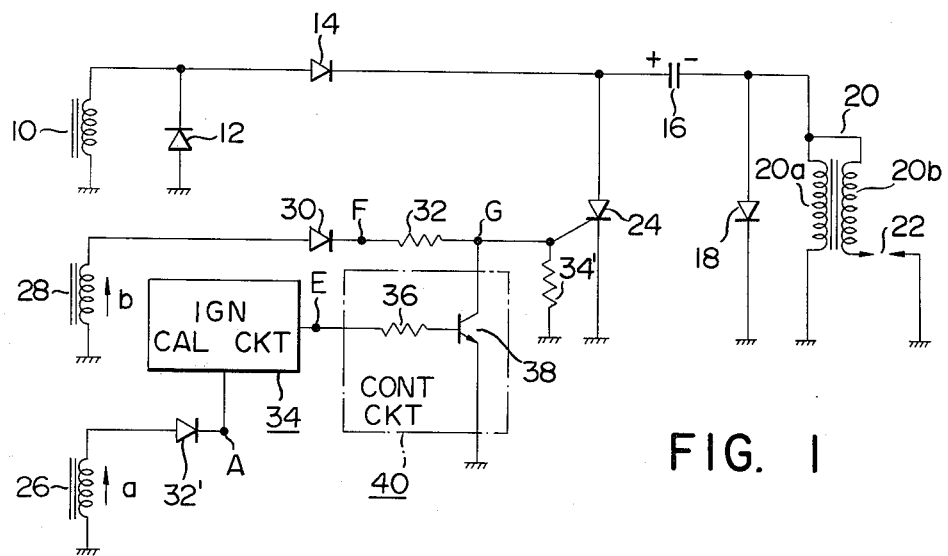
FIG. 1 is a circuit diagram of one embodiment according to the magneto ignition system of the present invention.

Referring now to FIG. 1 of the drawings, there is illustrated one embodiment according to the CDI (which is the abbreviation for "Capacitor Discharge Ignitor") magneto ignition system of the present invention. The illustrated arrangement comprises a generation coil 10 disposed on a magneto (not shown) serving as an electric source to generate an AC voltage having a positive and a negative polarity in synchronism with the rotation of an internal combustion engine (not shown), a semiconductor diode 12 connected across the generating coil 10 and another semiconductor diode 14 connected in series with the generating coil 10. The diode 12 has its anode electrode connected to ground. The diodes 12 and 14 rectify the AC voltage from the coil 10. The diode 14 supplies the rectified voltage to a capacitor 16 to charge it with a polarity which is illustrated in FIG. 1. The capacitor 16 is connected to a semiconductor diode 18 which forms a part of a discharge circuit therefor and is connected to ground. An ignition coil 20 is connected across that discharge circuit. More specifically, the ignition coil 20 has a primary winding 20a connected between the capacitor 16 and ground, and a secondary winding 20b having the one end connected to both the capacitor 16 and the primary winding 20a and having the other end connected to an ignition plug 22 which is subsequently connected to ground.

A thyristor 24 is connected between the junction of the capacitor 16 and the diode 14 and ground to form the other part of the discharge circuit for the capacitor 16. The thyristor 24 serves as a switching element so that, when put in its conducting state, the thyristor discharges an electric charge accumulated on the capacitor 16 and applied to the primary ignition winding 20a.

The arrangement further comprises a signal coil 26 forming a first angular position sensor to generate a first angular signal a with a polarity illustrated in FIG. 1 in response to a predetermined crank position of the engine. Another signal coil 28 forms a second angular position sensor to generate a second signal b with a polarity illustrated in FIG. 1 in response to a crank position of the engine which is delayed by a predetermined angle θ relative to the predetermined crank position of the engine where the first signal a is generated. The first and second signals a and b are operative to generate ignition signals for the engine, but the second signal b is broaded in pulse width or duration than the first signal a.

The signal coils 28 and 26 are connected to respective semiconductor diodes 30 and 32 serving to prevent the reverse flows of current.

The diode 30 is connected via a junction F to a resistor 32 which is subsequently connected to a gate electrode of the thyristor 24 through a junction G. The gate electrode is connected to ground through a gate resistor 34'.

On the other hand, the diode 32 is connected via a junction A to an ignition time calculation circuit generally designated by the reference numeral 34. That circuit 34 is connected via a junction E to base resistor 36 which is subsequently connected to a base electrode of an NPN common emitter transistor 36 having its collector electrode connected to the junction of the resistor 32 and the gate electrode of the thyristor 24.

The ignition time calculation circuit 34 is operative to calculate an ignition time in accordance with the particular conditions for operating the engine, starting with the first angular signal a. The transistor 38 along with the resistor 36 forms a control circuit generally designated by the reference numeral 40. The control circuit 40 is responsive to the conduction of the transistor 38 to bypass the angular signal b from the second signal coil 28 to ground through the now conducting transistor 38.

Figure 2:
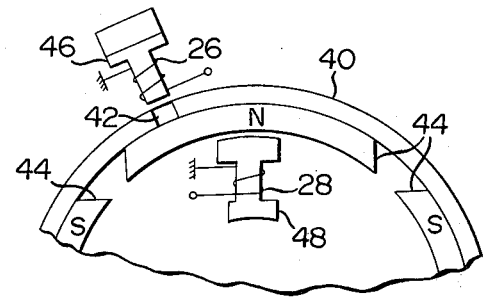
FIG. 2 is a fragmental front view of the structure of the angular position sensors shown in FIG. 1.

FIG. 2 shows the essential portion of an angular position sensor device including the first and second angular position sensors shown in FIG. 1. The illustrated arrangement forms a magneto and comprises a flywheel 40 in the form of a hollow cylinder, and four permanent magnets 44 fixedly disposed in equal angular intervals on the inner peripheral surface of the flywheel 40 so that an axial gap is formed between each pair of adjacent permanent magnets 44 having the opposite polarities. The arrangement further comprise a pair of axial slits 42 (only one of which is illustrated) disposed in a diametrically opposite relationship on the periphery of the flywheel 40; a first stator 46 is arranged with a permanent magnet disposed outside of the flywheel 40 so as to form a very small radial gap between the same and the flywheel 40 and has the first signal coil 26 wound thereabout. The axial slits 42 serve as a magnetic modulator. Furthermore a second stator 48 is disposed inside of the flywheel 40 so as to form a very small radial gap between the same and the flywheel 40 and has the second signal coil 28 wound thereabout.

During the rotation of the flywheel 40 each of the slits or magnetic modulators 42 repeatedly runs past the first stator 46 to cause the associated signal coil 26 to induce the first angular signal a in the form of a voltage thereacross. Also, the second signal coil 28 induces the second angular signal b in the form of a voltage due to the rotation of the permanent magnets 44 attended on that of the flywheel 40. Because of the relatively large arc length of the permanent magnets 44, the resulting angular signal b is larger in pulse width or duration than the angular signal a.

Figure 3:
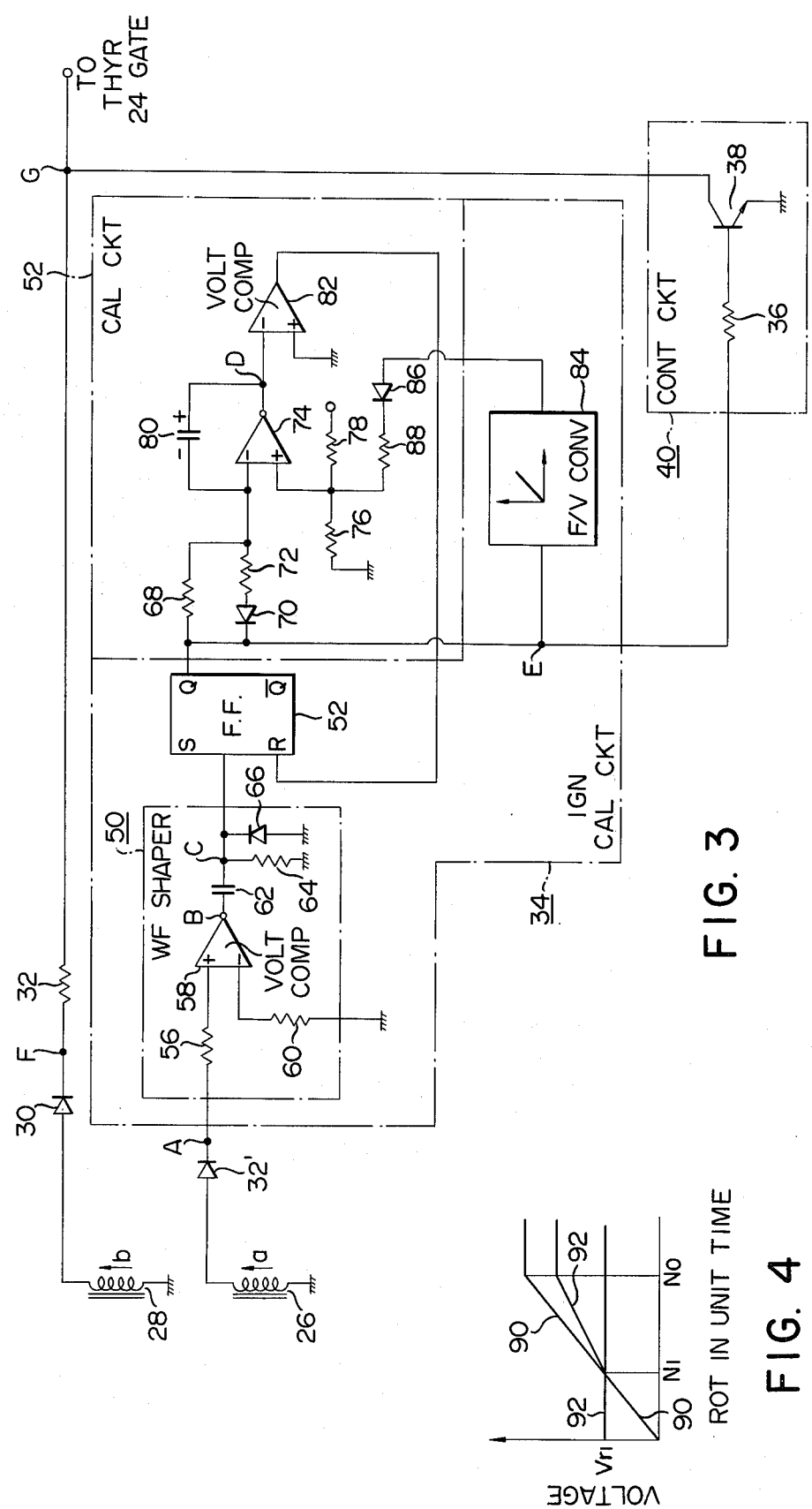
FIG. 3 is a circuit diagram of the details of the ignition time calculation circuit shown in FIG. 1 along with the associated components.

The ignition time calculation circuit 34 may be preferably of a circuit configuration shown in FIG. 3. The ignition time calculating circuit 34 comprises a waveform shaper circuit generally designated by the reference numeral 50, a FLIP-FLOP circuit 52 and a calculation circuit generally designated by the reference numeral 54, connected in series to one another in the named order.

The waveform shaper circuit 50 has an input resistor 56 connected to the diode 32', a voltage comparator 58 having a positive input connected to the input resistor 56, a negative input connected to ground through another input resistor 60 and an output or a junction B connected to a capacitor 62. Capacitor 62 is connected to ground through a junction C and an output resistor 64 connected across a semiconductor diode 66 having its anode electrode connected to ground.

The junction C is connected to the set input S of the FLIP-FLOP circuit 52 having an output Q.

The calculation circuit 54 has a resistor 68 which is connected to the output Q of the FLIP-FLOP circuit 52 and which is also connected across a series combination of a semiconductor diode 70 and a resistor 72 and subsequently connected to an inverting or negative input to an operational amplifier 74 having its non-inverting or positive input connected to ground through an input resistor 76 and also to a suitable voltage through a resistor 78. The operational amplifier 74 has an output fed back to its negative input through a junction D and a capacitor 80 and is also connected to a negative input of a voltage comparator 82 having its positive input connected to ground and having an output connected to the reset input R of the FLIP-FLOP circuit 52.

The output Q of the FLIP-FLOP circuit 52 is further connected via a junction E to a frequency to voltage converter 84 forming a part of the ignition calculation circuit 34. The output of the frequency-to-voltage converter 84 is connected to the positive input of the operational amplifier 74 through a series combination of a semiconductor diode 86 and a resistor 88.

The junction E is also connected to the control circuit 40.

The waveform shaper circuit 50 is operative to shape a waveform delivered from the signal coil 26 and the calculation circuit 54 is operative to produce a predetermined output in response to the rotational speed of the internal combustion engine (not shown). The frequency-to-voltage converter 84 is operative to convert the shaped output from the FLIP-FLOP circuit 52 resulting from the angular signal a to a DC voltage proportional to the rotational speed of the engine by using the applied shaped output as a signal corresponding to the rotational speed of the engine.

Figure 4:
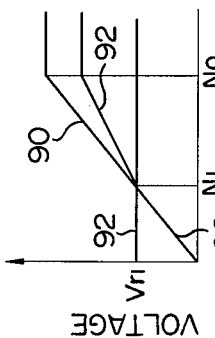
FIG. 4 is a graph illustrating the output characteristic of the frequency-to-voltage converter shown in FIG. 3.

In FIG. 4, wherein the axis of ordinates represents a voltage and the axis of abscissas represents the rotational speed of the engine, the output characteristic of the frequency-to-voltage converter 84 is shown, by way of example, by a straight line 90 which changes linearly with respect to the rotational speed of the engine. As shown in FIG. 4, the output voltage from the frequency-to-voltage converter 84 is preliminarily set such that its magnitude Vr1 at the rotational speed N1 of the engine is equal to that of a bias voltage Vr1 at the positive input to the operational amplifier 74. Under these circumstances, the operational amplifier 74 has the bias voltage at the positive input thereto first maintained at the constant voltage Vr1 up to the rotational speed N1 of the engine and then linearly changed with the rotational speed until the engine reaches the rotational speed No as shown by line 92 in FIG. 4. Thereafter, the bias voltage is again maintained constant.

In the arrangement of FIG. 1, the rectified output from the generating coil 10 charges the capacitor 16 with the polarity illustrated therein. An electric charge accumulated on the capacitor 16 conducts the thyristor 24 through the ignition coil 20 at each of the ignition times of the engine, that is, when the ignition time calculation circuit 34 receiving the first angular signal a from the first signal coil 26 generates an output and when the second signal coil 28 generates the angular signal b. This conduction of the thyristor 24 causes the charge on the capacitor 16 to be applied to the primary ignition winding 20a to induce a high voltage across the secondary ignition winding 20b. The high voltage causes an electric spark to strike at the ignition plug 22.

Figure 6:
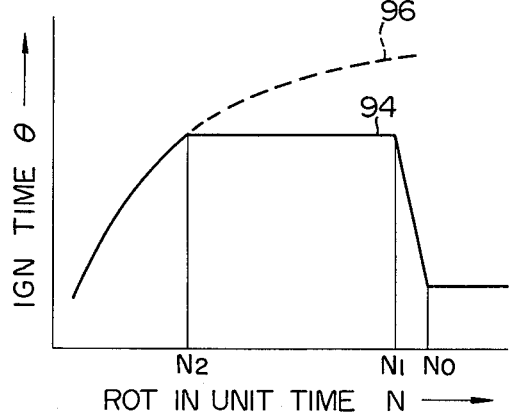
FIG. 6 is a graph illustrating the spark advance characteristics exhibited by the arrangement shown in FIG. 1 or 3.

The operation of the arrangement shown in FIGS. 1 and 3 will be described in more detail in conjunction with FIGS. 5 and 6 along with describing the means for adjusting a time where the thyristor 24 is conducting, i.e. the ignition time. FIG. 5 shows waveforms developed at the junctions A, B, C, D, E, F and G shown in FIG. 1 and/or FIG. 3 on the time base illustrated by the uppermost horizontal line (a) in FIG. 5. The time base is represented by the crank position of the engine so that the reference characteristic M designates a position which is somewhat ahead of a maximum spark advance position required for the engine and having generated thereat the first angular signal a shown at waveform (b) in FIG. 5 and the reference character S designates a position where the second angular signal b is generated as shown at waveform (g) in FIG. 5. The reference character T designates the upper dead point of the crank. In FIG. 6, wherein the axis of ordinates represents the ignition time $\theta$ of the engine and the axis of abscissas represents the rotational speed N of the engine therein is illustrated the spark advance characteristic exhibited by the arrangement shown in FIGS. 1 or 3.

It is assumed that the engine is rotated at a constant speed corresponding to rotational speed which is higher than a magnitude N1 and less than a magnitude No as shown in FIG. 6 and that a spark advance position is not null but goes ahead of the position T by an angle $\alpha$. Under the assumed conditions the arrangement shown in FIG. 1 or 3 is operated as follows:

In the following, a voltage or an output developed at each of the junctions as described above is designated by the same reference character identifying the associated junction. For example an output from the FLIP-FLOP circuit 52 developed at the junction E is designated by the reference character E.

First, the frequency-to-voltage converter 84 is operated to count or integrate the output voltage from the FLIP-FLOP circuit 52 corresponding to the rotational speed of the engine. The resulting voltage (which is also designated by the reference numeral 90) from the converter 84 is higher than the bias voltage Vr1 for the operational amplifier 74. That voltage 90 provides an input voltage to the operational amplifier 74 which, in turn, has a voltage (which is also designated by the reference numeral 92) at the positive input thereto changed with the rotational speed of the engine as shown at 92 in FIG. 4.

On the other hand, the FLIP-FLOP circuit 52 is set with a rise to a high level of an output voltage C (see waveform (c) FIG. 5) at the position T resulting from an output voltage B from the voltage comparator 58 (see waveform (c), FIG. 5). Thus, the FLIP-FLOP circuit 52 produces an output voltage E at the output Q thereof and therefore at the junction E. That voltage is at a high level as shown at waveform (f) in FIG. 6. When the output voltage E is put at the high level, the capacitor 16 charged with the polarity illustrated in FIG. 6 and is initiated to discharge with a current $i_2$ expressed by $i_2 = \{$(high output voltage from FLIP-FLOP 52)$-$(voltage 92 at positive input to operational amplifier 74)$\} \div$(resistance of resistor 68).

As seen from the above expression, the discharge current $i_2$ has a magnitude dependent upon the voltage 92 at the positive input to the operational amplifier 74 as long as the resistor 68 has a constant magnitude of resistance. The discharge current $i_2$ also depends upon the output voltage 90 from the frequency-to-voltage converter 84 in that region in which its dependency on the output voltage 92 is held. That is, the discharge current $i_2$ becomes low and gentle in slope with an increase in the rotational speed of the engine. This results in an increase in pulse width or duration of the high output voltage E from the FLIP-FLOP circuit 52. This increased pulse width of the output voltage E attributes to the result of calculation effected by the calculation circuit 54.

By initiating the capacitor 80 to discharge, the output voltage D from the operational amplifier 74 descends, as shown at waveform e, the descending portion labelled $i_2$ in FIG. 5, until it reaches a null magnitude. At that time, the voltage comparator 82 produces a positive pulsed voltage at the output. The pulsed voltage is applied to the reset input R of the FLIP-FLOP circuit 52 to reset it with the result that the output voltage E therefrom is put at a low level (see waveforms (e) and (f), FIG. 5).

When the FLIP-FLOP circuit 52 has produced the low output voltage E in this way, the capacitor 80 is initiated to charge with the polarity illustrated in FIG. 3. A charging current $i_1$ may be expressed by $i_1$ = [{(voltage 92 at positive input to operational amplifier 74)−(voltage drop across diode 70)}]÷(resistance of resistor 72)+{(voltage 92 at positive input to operational amplifier 74)÷(resistance of resistor 68)}.

As seen from the above expression, that charging current $i_1$ has a magnitude dependent upon the voltage 92 at the positive input to the operational amplifier 74 as long as the resistors 68 and 72 have constant magnitudes of resistance. In other words, the charging current depends upon the output voltage 90 from the frequency-to-voltage converter 84 in that region in which its dependence on the voltage 92 so that the charging current $i_1$ become high and steep in slope with an increase in the rotational speed of the engine (see waveform (e), the ascending portion labelled $i_1$ in FIG. 5). Therefore, the high output voltage E from the FLIP-FLOP circuit 52 increases in pulse width or duration with an increase in the rotational speed of the engine.

The output voltage E thus provided by the ignition time calculation circuit 34 is applied to the transistor 38 through the base resistor 36 to put the transistor 38 in its conducting state. Accordingly, the second angular signal b or the output voltage F (see waveform (g), FIG. 5) from the signal coil 28 is bypassed to ground through the now conducting transistor 38 which continues till the end or fall of the output voltage E. Therefore, a voltage developed at the junction G has a waveform (h) shown in FIG. 5 as will readily be understood from the position of the output voltage F relative to the output voltage E (see waveforms (g) and (f), FIG. 5). That voltage G is applied to the gate electrode of the thyristor 24.

From the foregoing, it is seen that the high output voltage E from the FLIP-FLOP circuit 52 has a fall time delayed with an increase in the rotation speed of the engine between its magnitudes N1 and N2 (see FIG. 6) or in a high speed region. As a result, the conduction time of the thyristor 24 and therefore the ignition time is delayed with an increase in the rotational speed of the engine as shown at curve 92 in FIG. 4.

When the engine reaches the rotational speed No, the output voltage 90 from the frequency-to-voltage converter 84 becomes constant as does the voltage 92 at the positive input to the operational amplifier 74. Accordingly, in spite of an increase in the rotational speed of the engine, the fall time of the high output voltage E and therefore the ignition time of the engine remains unchanged.

It is now assumed that the output voltage B from the voltage comparator 58 is again put at the high level in the crank position M (see FIG. 5) in a range in which the rotational speed of the engine is smaller than the magnitude N1 and larger than a magnitude N2 (see FIG. 6). Under the assumed conditions, the FLIP-FLOP circuit 52 is similarly set as described above to permit the capacitor 80 to discharge. At that time, the output voltage 90 from the frequency-to-voltage converter 84 is less than the bias voltage Vr1 applied to the operational amplifier 74 as seen in FIG. 4. Thus, the output voltage 90 does not contribute to the discharge current $i_2$ and the latter may be expressed by $i_2$ = {(high output voltage E from FLIP-FLOP)−Vr1}÷(resistance resistor 68).

From the above expression, it is seen that in the range as described above the discharge current $i_2$ has a magnitude maintained constant independently of the rotational speed of the engine. The charging current $i_1$ also may be expressed by $i_1$ = {Vr1−(voltage drop across diode 70)}÷(resistance resistor 72)+Vr1÷(resistance resistor 68).

The above expression states that, in spite of the rotational speed of the engine, the charging current is constant. Therefore, for a rotational speed of the engine lying between its magnitudes N1 and N2 or in a moderate speed range, the output voltage E from the FLIP-FLOP circuit 52 has its pulse-width or duration maintained constant regardless of the rotational speed of the engine. This means that the transistor 38 and the thyristor 24 have respective conduction times maintained current regardless of the rotational speed of the engine. Accordingly, the ignition time of the engine remains unchanged as shown in FIG. 6.

In a low speed range in which the rotational speed of the engine is less than the magnitude N2 (see FIG. 6), the output voltage E from the FLIP-FLOP circuit 52 has its pulse-width or duration maintained constant regardless of the rotational speed of the engine. This is because the angular signal a results in the respective discharging and charging currents $i_2$ and $i_1$ through the capacitor 80 being maintained constant as described above.

On the other hand, the angular signal b from the signal coil 28 is of a low voltage due to the low rotational speed of the engine (see waveform (g), FIG. 5). Therefore, even if the output voltage E from the ignition time calculating circuit 34 is bypassed through the transistor 38, the voltage at the junction G does not reach a threshold voltage VG (see waveform (h), FIG. 5) required for the thyristor 24 to be conducting upon the completion of that bypass or upon the fall of the voltage E. This means that the result of the calculation effected by the ignition time calculation circuit 34 does not play a role in igniting the engine. Upon the angular signal b from the signal coil 28 reaching the threshold voltage VG thereof, the thyristor 24 conducts so as to cause the ignition of the engine as described above.

Accordingly, only the angular signal b from the signal coil 28 having the long duration contributes to the conduction of the thyristor 24 in such a low rotational range resulting in the spark advance characteristic such as shown by the solid portion of curve 96 in FIG. 6. This is because only the angular signal b which is broad in pulse width or duration contributes to the conduction of the thyristor 24. That is, the signal broad in pulse width is increased with an increase in the rotational speed of the engine up to its magnitude N2.

In short, the ignition time advances with the growth of the output voltage F from the signal coil 28 (see waveform (g), FIG. 5) at a rotational speed of the engine which is not greater than its magnitude N2. In excess of the magnitude N2, the ignition time occurs at the fall of the high output voltage E obtained as a result of the calculation effected by the ignition time calculation circuit 34, that is to say, at the transition of the high to the low level of the output voltage E. This is because the output voltage F from the signal coil 28 is bypassed with the high level of the output voltage E due to the result of the abovementioned calculation for the output voltage F less than the threshold voltage VG of the thyristor 24; the latter case resulting spark advance characteristic is shown by the solid curve 94 in FIG. 6.

Thus, as shown by curves 94 and 96 in FIG. 6, the composite spark advance characteristic is formed of the first spark advance characteristic resulting from the first angular signal and the second spark advance characteristic resulting from the second angular signal which is broader in pulse width than the first angular signal.

Figure 7:
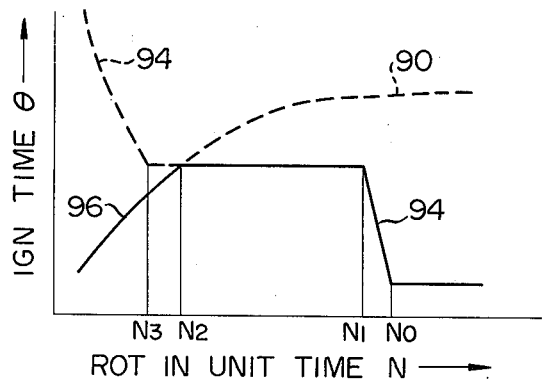
FIG. 7 is a graph similar to FIG. 6 but illustrating a modification of the present invention.
Figure 8:
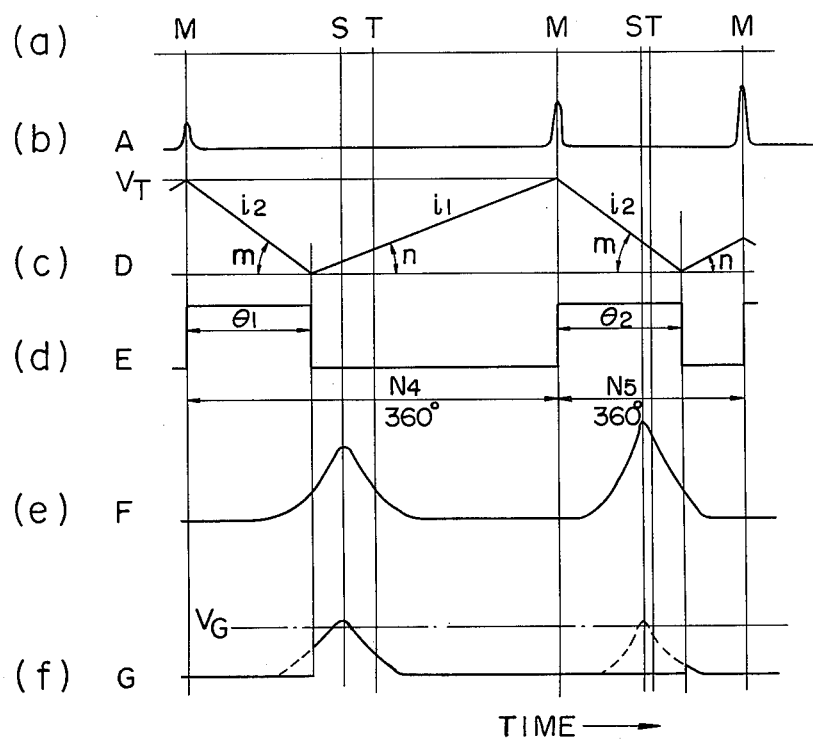
FIG. 8 is a graph illustrating waveforms developed at various points in the arrangement shown in FIGS. 1 or 3 in a low speed range with a great variation in the rotational speed of the internal combustion engine.

It has been found that, when the rotational speed of the engine is greatly or suddenly changed in the low speed range, the arrangement shown in FIG. 1 or 3 is objectional in that the stable, reliable ignition time may not be provided, such timing being illustrated in FIG. 7 wherein like reference numerals and characters designate the components similar to those shown in FIG. 6. In FIG. 7, the first and second spark advance characteristics are shown by the solid curve 96 and a dotted extension of the solid line 94 as extending into a low speed range defined between magnitudes N2 and N3 of the rotational speed of the engine. That is, one of the ignition times may occur in the low speed range which follows either one of the two spark advance characteristics as the case may be for the following reasons:

It is assumed that the rotational speed of the engine suddenly changes from its mean magnitude N4 to N5 in the low speed range for some reasons as shown in FIG. 8). In FIG. 8 waveforms are shown as being developed at various points in the arrangement illustrated in FIG. 1 or 3 by employing like reference characters designating the components identical to those shown in FIG. 5 except for the parenthesized reference characters. For example, the voltage D shown at waveform (c) is developed at the junction D forming the output of the operational amplifier 74. It is also to be noted that the angular interval between each pair of adjacent positions M has an angle of 180 degrees in FIG. 5 and of 360 degrees in FIG. 8 only for the purposes of illustration.

With the engine rotated at the mean rotational speed N4, a discharge time interval of the capacitor 80 corresponds to an angle $\theta 1$ in degrees of rotation of an associated crank expressed by $$\theta 1 = \{n/(m+n)\} \times 360$$

where m and n designate slopes of the discharge and charging currents $i_2$ and $i_1$ relative to the time base (see waveform (c), FIG. 8). Assuming that the engine is rotated in its steady state and that the slopes m and n are constant, the angle $\theta 1$ remains unchanged regardless of the rotation of the engine. In other words, a voltage VT at the crest of the discharge and discharging curves is changed and stabilized. Under these circumstances, the voltage G applied to the gate electrode of the thyristor 24 (see FIG. 1) is partly bypassed to ground as described above in conjunction with FIGS. 3 and 5 (see the lefthand waveform shown at waveform (f), FIG. 8).

However, if the rotation of the engine suddenly increased to the rotational speed N5 for some reason, then one complete rotation of the crank sharply reduces the time interval occupied thereby. This complete rotation of the crank corresponds to a time interval between the position M and the next succeeding one shown in the uppermost row in FIG. 8. This results in a sharp increase in the angle $\theta 2$ in a rotational region with the mean rotational speed N5 of the engine because that angle $\theta 2$ is equal in time interval to the angle $\theta 1$ in a region with the mean magnitude of rotational speed. In the extreme case, the second angular signal b or the output voltage F may be entirely bypassed to ground as seen from the righthand waveform shown at waveform (f) in FIG. 8.

As a result, the stable, reliable ignition time can not be provided. Furthermore, the variation in the rotational speed of the engine is particularly large during the start thereof and accordingly, the engine may be difficult to start.

In order to eliminate the objections as described above, a modification of the present invention is arranged to maintain the crest voltage VT constant at and below a predetermined rotational speed N3 of the engine (see FIG. 7) regardless of the rotation thereof. To this end, the output B of the voltage comparator 58 and the negative input to the voltage comparator 82 are connected to ground through a constant voltage element such as a Zener diode to clip the crest voltage VT1. Alternatively, the crest voltage may be clipped by an electric source with increasing the slopes of the discharge and discharging curves relative to the time base. Furthermore, the resistors 68 and 72 or the capacitor 80 may be of the variable type. Furthermore, the resistors 76 and 78 may be variable in magnitude of resistance. However, these measures are illustrated only for the purposes of illustration.

Figure 9:
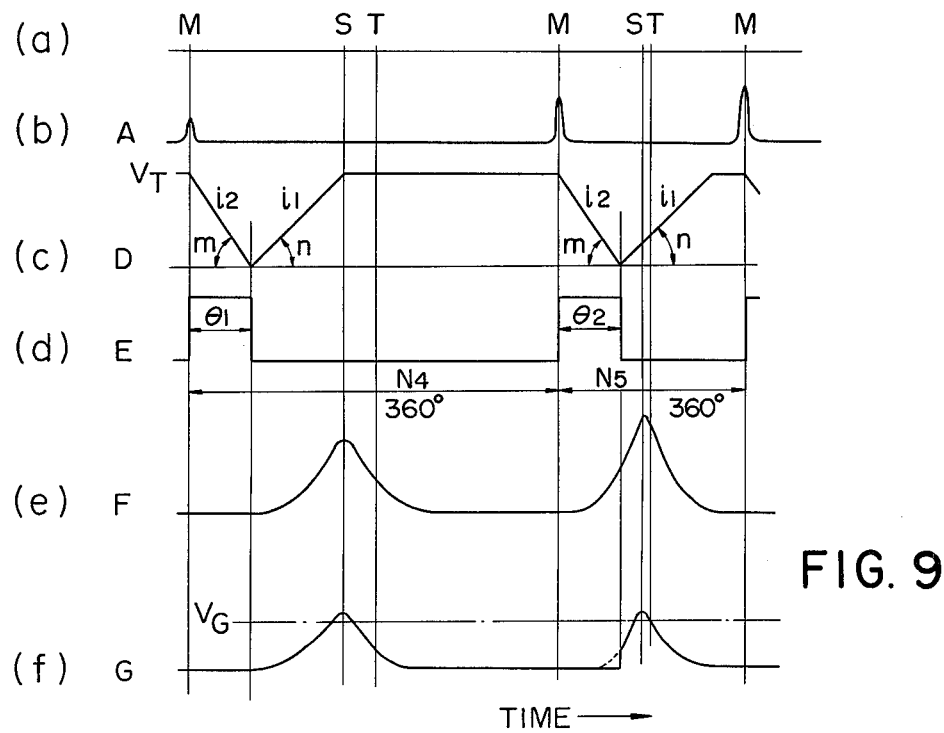
FIG. 9 is a graph similar to FIG. 8 but illustrating the modification of the present invention.

In FIG. 9, wherein like reference characters designate the components identical or corresponding to those shown in FIG. 8, there are the voltages A, D, E, F and G at waveforms (b), (c), (d), (e) and (f) respectively. As shown at waveform (c) in FIG. 9, the crest voltage VT1 is maintained constant between the end of the charging current $i_1$ and the start of the next succeeding discharge current $i_2$. Therefore, assuming that the slopes m and n are constant, the discharge time interval designated by the angle $\theta 1$ or $\theta 2$ remains unchanged regardless of the rotational speed of the engine. As a result, the discharge time interval or angle decreases with a decrease in the rotational speed of the engine (see the spark advance characteristic 94 at and below the rotational speed N3 of the engine, FIG. 7). Under these circumstances, even though the engine suddenly increase in rotational speed to reach the mean rotational speed N5 (see FIG. 9), the voltage G is prevented from being entirely bypassed to ground as shown at waveform (f) in FIG. 8. This results in the accurate stable ignition time occurring even with a variation in rotational speed of the engine up to at least the mean rotational speed N3 shown in FIG. 7. In other words, the ignition time advances with the growth of the second angular signal at and below the mean rotational speed N3 of the engine.

At and above the rotational speed N2 of the engine, the modification of the present invention is operated as described above in conjunction with FIG. 8. However, since a variation in rotational speed of the engine is extremely small in the moderate and high speed ranges, there are eliminated the objections as described above in conjunction with FIG. 8.

From the foregoing it is seen that the present invention is arranged to determine the ignition time by a first angular signal narrow in pulse width after it has been calculated by an ignition time calculation circuit in a moderate and a high speed range of the particular internal combination engine in which the ignition time is required to occur with a high accuracy, in view of the horsepower of the engine. Furthermore, in a low speed range of the engine in which the accuracy thereof is not required to be so high, the ignition time is determined by utilizing a second angular signal generated at a crank position delayed with a predetermined angle relative to a position where the first signal is generated, so as to be broader in pulse width than the first angular signal and having a waveform which increase with an increase in the rotational speed of the engine. This results in a composite spark advance characteristic formed of a first spark characteristic caused from the first angular signal and a second spark advance characteristic caused from the second angular signal so as to determine the ignition times with a high accuracy in the moderate and high speed ranges of the engines. Therefore, an accurate and stable ignition time can be determined in the low speed range in which the engine speed may be sharply varied.

In the low speed range of the engine, in which the rotational speed of the engine varies large and suddenly and particularly during the start thereof, the ignition time is accurately and stably determined by delaying the result of a calculation effected by the ignition time calculation circuit for a predetermined time interval regradless of the rotational speed of the engine.

Accordingly, the present invention provides a magneto ignition system for determining the accurate and stable ignition times in the low, moderate and high speed ranges of the engine.

While the present invention has been described in conjunction with a few preferred embodiments thereof, it is to be understood that numerous changes and modifications may be resorted to without departing from the spirit and scope of the present invention.

What is claimed is:

1. A magneto ignition system comprising electric source means for generating a positive and a negative output in synchronism with the rotation of an internal combustion engine, and ignition coil, a rectification means operatively connected to said electric source means for passing one of said positive and negative outputs to said ignition coil after the rectification thereof, a switching element for controlling the conduction of said rectified output to said ignition coil, a first angular position sensor means for generating a first angular signal in synchronism with the rotation of said engine and corresponding to a predetermined crank position of said engine, a second angular position sensor means for generating a second angular signal in synchronism with the rotation of said engine and corresponding to a crank position thereof delayed by a predetermined angle relative to said predetermined angle relative to said predetermined crank position, wherein said first and second sensor means are arranged such that said second angular signal is of a longer duration than said first angular signal and is supplied directly to said switching element, an ignition time calculating circuit for calculating an ignition time in accordance with the conditions for operating said engine with said first angular signal, and a control circuit connected to said switching element and responsive to a signal corresponding to a result of the calculation effected by said ignition time calculation circuit so as to bypass said second angular signal therethrough.

2. A magneto ignition system as claimed in claim 1, further comprising a first means for forming a composite spark advance characteristic of a first spark advance characteristic resulting from said first angular signal and a second spark advance characteristic resulting from said second angular signal to cause only a portion on the receding side of said composite spark advance characteristic to contribute to the ignition, a second means for forming the advancing and receding sides of said first and second spark advance characteristics respectively at and below a predetermined rotational speed of said engine, and third means for forming the receding and advancing sides of said first and second spark advance characteristics respectively above said predetermined rotational speed of said engine.

3. A magneto ignition system as claimed in claim 2, wherein said ignition time calculation circuit provides said signal corresponding to the result of the calculation delayed by a predetermined time interval at least below said predetermined rotational speed of said engine.

4. A magneto ignition system as claimed in claim 1, wherein said ignition time calculation circuit includes a frequency-to-voltage converter for generating a DC voltage which is proportional to the rotational speed of said engine.

* * * * *